United States Patent [19]

Williams et al.

[11] Patent Number: 5,114,637
[45] Date of Patent: May 19, 1992

[54] METHOD AND APPARATUS FOR MOULDING A FLUID SETTABLE MATERIAL

[75] Inventors: David R. Williams, Liskeard, England; Trevor P. Gibson, County Armagh, Northern Ireland

[73] Assignee: Short Brothers PLC, Belfast, Northern Ireland

[21] Appl. No.: 477,329

[22] Filed: Feb. 8, 1990

[30] Foreign Application Priority Data

Feb. 9, 1989 [GB] United Kingdom ............... 8902841

[51] Int. Cl.$^5$ .................. B29C 45/23; B29C 45/34; B29C 45/76
[52] U.S. Cl. ................. 264/40.3; 264/571; 264/101; 264/255; 264/328.8; 264/DIG. 78; 425/147; 425/173; 425/388; 425/546; 425/555; 425/DIG. 60
[58] Field of Search ............... 264/101, 235, 258, 570, 264/571, 102, DIG. 78, 255, 245, 40.3, 328.8, 328.1; 425/84, 85, 388, 147, DIG. 60, 546, 173, 405.1, 595, 555

[56] References Cited

U.S. PATENT DOCUMENTS

| | | | |
|---|---|---|---|
| 2,903,389 | 9/1959 | Fujita | 264/102 |
| 3,055,058 | 9/1962 | Van Hartesveldt | 264/DIG. 78 |
| 3,410,936 | 11/1968 | Juras . | |
| 4,030,953 | 6/1977 | Rutschow et al. | 264/101 |
| 4,036,922 | 7/1977 | Ho et al. | 264/102 |
| 4,359,437 | 11/1982 | Le Comte | 264/571 |
| 4,767,308 | 8/1988 | Adams | 425/DIG. 60 |
| 4,855,097 | 8/1989 | Iseler et al. | 264/258 |
| 5,000,902 | 3/1991 | Adams | 264/255 |

FOREIGN PATENT DOCUMENTS

| | | |
|---|---|---|
| 219269 | 1/1962 | Austria . |
| 2756384 | 7/1980 | Fed. Rep. of Germany . |
| 859006 | 1/1961 | United Kingdom . |
| 1432333 | 4/1976 | United Kingdom . |

*Primary Examiner*—Jeffery Thurlow
*Assistant Examiner*—Mathieu Vargot
*Attorney, Agent, or Firm*—Needle & Rosenberg

[57] ABSTRACT

A method and apparatus for moulding a fluid settable material. The apparatus includes male and female mould halves defining between them a mould cavity having an inlet thereto for the introduction of a fluid settable material; between the male and female mould halves of the cavity a seal can be interposed to seal the mould cavity from the atmosphere. At least one vacuum outlet from a mould half leads via an isolation valve to a vacuum source. The method includes the steps of creating a depression in the mould cavity by withdrawing air therefrom through the vacuum outlet via the isolation valve, introducing a fluid settable material into the thus evacuated mould cavity until the mould cavity is wholly filled by the settable material, closing the isolation valve between the vacuum outlet and the vacuum source, injecting a small additional quantity of fluid settable material under pressure into the mould cavity, closing the inlet through which the fluid material is introduced into the mould cavity and allowing the fluid settable material to solidify.

14 Claims, 2 Drawing Sheets

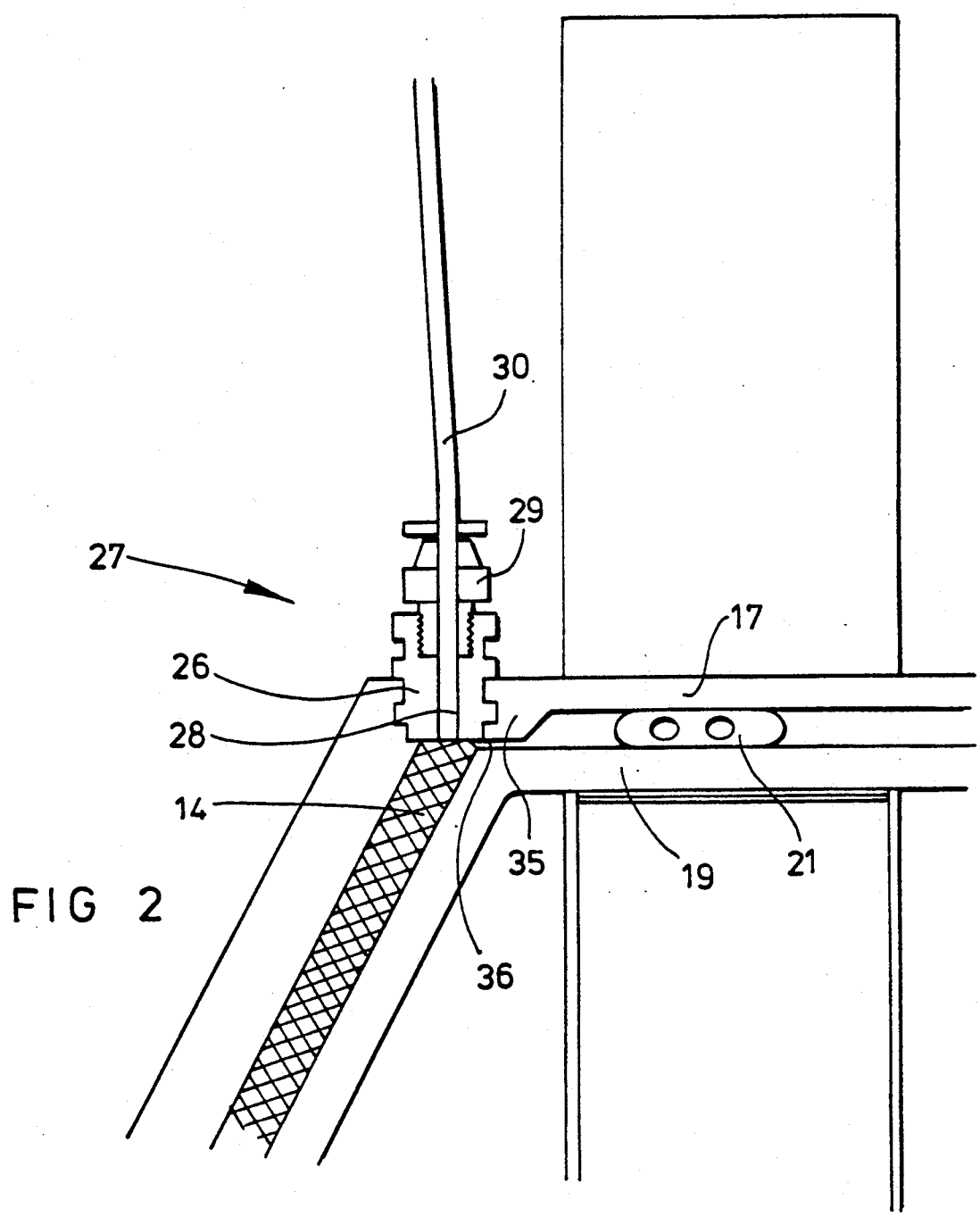

METHOD AND APPARATUS FOR MOULDING A FLUID SETTABLE MATERIAL

BACKGROUND OF THE INVENTION

The invention relates to a method and apparatus in which a mould cavity is evacuated prior to the introduction of a fluid settable material. As used in this specification the term fluid will be understood to refer to any material in a state such that it can flow, and in particular will include not only liquid but also paste-like materials. Further, the term "settable" will be understood to refer to any fluid material capable of becoming solid after the elapse of time, regardless of the physical phenomenon which results in solidification, and will include hardening upon heating or cooling, curing by chemical or other means and any other solidification process which will result in a fluid material a hereinbefore defined becoming solid.

Prior art apparatus for moulding articles in an evacuated cavity is typified by the mould described in UK Patent 1,432,333 which comprises a male and female mould part shaped to be assembled to define a cavity, a seal for sealing the cavity against the atmosphere, and an aperture in one of the mould parts for the application of a vacuum to the cavity, the mould parts and the seal being arranged to permit drawing of the mould parts together with relative movement thereof at the seal. The use of an internal vacuum to draw the male and female mould parts together is stated in that Patent to have the advantage that the only pressure to which the mould is subject is atmospheric pressure acting uniformly over the whole mould surface to squeeze the moulding material into the empty parts of the cavity during the closing down of the mould so that the mould parts need only be sufficiently robust to avoid distortion under these conditions.

It is considered, however, that the satisfactory production of injection moulded items, particularly if resin is used as the flowable material, requires more than the mere evacuation of the mould cavity to ensure a complete filling of the mould and avoidance of cavitation bubbles in the material before setting so that components of accurate dimensions, complete form and homogeneous structure are reliably produced upon each moulding operation.

OBJECTS OF THE INVENTION

The primary object of the invention is to provide apparatus for moulding a fluid settable material, and a method of moulding such material in which a vacuum is applied to the mould cavity prior to the introduction of the settable material as in the prior art moulding technique, but in which the mould cavity is not formed by mould halves which are relatively movable with respect to one another under the action of the vacuum applied to the mould cavity prior to introduction of the settable material.

SUMMARY OF THE INVENTION

The invention thus provides apparatus for moulding a fluid settable material comprising male and female mould halves defining therebetween a mould cavity, sealing means interposable between the male and female mould halves to seal the mould cavity from the atmosphere, at least one vacuum outlet from a mould half leading via an isolation valve to a vacuum source, and an inlet to the mould cavity for the introduction of a fluid settable material thereto.

Although only one mould half may be provided with a single vacuum outlet as a minimum requirement, in practice a plurality of vacuum outlets may be provided on one or both mould halves. A mould comprising a male and female mould half may be provided with a plurality of vacuum outlets spaced along or around the periphery of the mould cavity thus formed.

Between the mould cavity defined by opposite facing surfaces of correspondingly shaped mould halves and the sealing means between the two mould halves which isolate the mould cavity from the atmosphere there may be a mould region separated from the mould cavity itself by a line of contact between the mould halves or a line of closest approach of the mould halves which defines the perimeter of the mould product. This line of closest approach will be referred to hereinafter as the "pinch line" between the mould cavity and the space sealed by the sealing means.

The vacuum outlet from the mould cavity may include a transparent duct section allowing visual inspection of the degree of filling of the mould cavity. Complete filling of the mould cavity can be assumed when all duct sections leading from vacuum outlets from the mould cavity can be seen to contain settable material.

In a preferred embodiment of the invention mould comprises mould halves which each have respective flanges between which the sealing means are pressed when the mould halves are fitted together to define the mould cavity. The flanges may be acted upon by respective clamp means which hold the mould halves together and resist separation thereof during moulding. Preferably the clamp means or members overlie the sealing means on the flanges.

The injection point for introducing settable moulding material into the vacuum cavity is preferably located at a point spaced from the vacuum outlets by the maximum distance, and is preferably equally spaced from the vacuum outlets in a mould cavity having a plurality of such outlets.

The vacuum outlets may comprise mould inserts having threaded sockets for receiving an outlet duct retainer. The mould inserts may be secured to a mould half by any conventional technique, and in particular may be threadedly engaged in the mould half or may be moulded in situ into a shaped aperture in the mould half.

According to another aspect of the present invention a method of moulding a fluid settable material comprises the steps of pulling a vacuum in a mould cavity defined by male and female mould halves and sealed from the atmosphere by sealing means, by withdrawing air therefrom through at least one vacuum outlet leading via an isolation valve to a vacuum source, introducing a fluid settable material as hereinbefore defined into the thus evacuated mould cavity until the mould cavity is wholly filled by the settable material, closing the isolation valve between the vacuum outlet through which the air from the mould cavity is drawn and the vacuum source, injecting a small additional quantity of fluid settable material under pressure into the mould cavity, closing the inlet through which the fluid material is introduced into the mould cavity and allowing the fluid settable material to solidify.

In the method of the present invention the mould halves are preferably retained in a fixed position with respect to one another to define the mould cavity by an appropriately shaped clamping frame which engages the above-mentioned peripheral flanges of the mould halves to apply an even pressure thereto over the area of each flange.

Preferably, in performing the method of the invention, the said vacuum isolation valve is separated from the vacuum outlet from the mould cavity by a length of transparent ducting and the isolation valve is closed when the fluid introduced into the mould cavity appears in the said transparent ducting.

Other features and advantages of the present invention will become apparent from a study of the following description in which reference is made to the accompanying drawings, provided purely by way of non-limitative example.

BRIEF DESCRIPTION OF THE DRAWINGS

FIG. 2 is an enlarged sectional view of a part of the mould illustrated in FIG. 1 showing a detail thereof.

DESCRIPTION OF THE PREFERRED EMBODIMENTS

Figure 1:
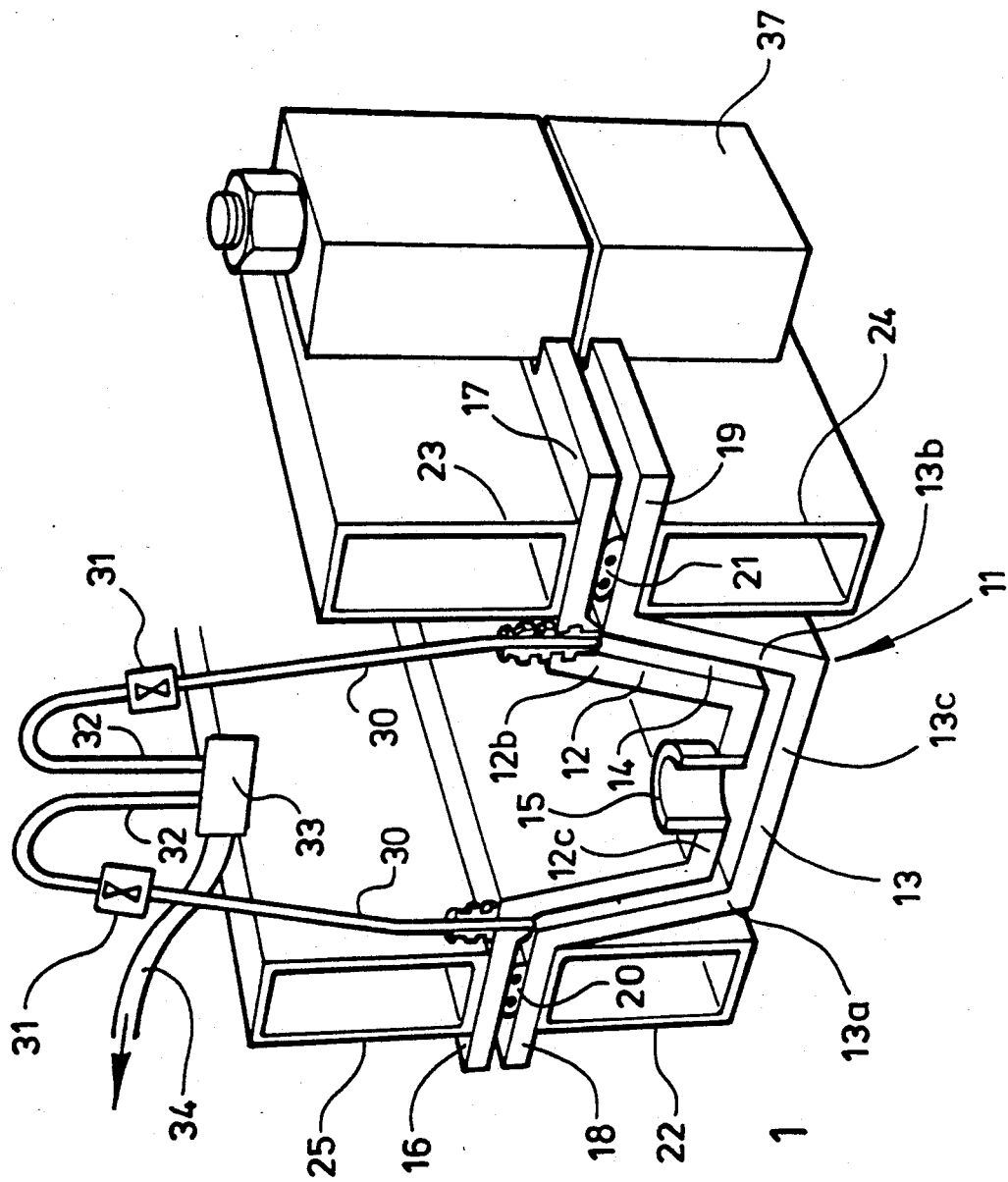
FIG. 1 is a cross-sectional view through a mould formed as an embodiment of the present invention.

Referring now to the drawings a mould generally indicated by the reference numeral 11 and constituted by a male mould half 12 and a female mould half 13 defines a mould cavity 14 within which a resin is to be injected to produce moulded articles. The exemplary mould 11 shown in FIG. 1 is shaped to produce mould products having a generally U-shape cross-section, and the male mould half 12 comprises two side walls 12a, 12b joined by a bottom wall 12c and having respective flanges 16, 17, projecting from the free edges of the side walls 12a, 12b, parallel to the bottom wall 12c. An injection port 15 is provided in the bottom wall 12c for the introduction of settable fluid material into the mould cavity 14.

The female mould half 13 likewise has a generally U-shape cross-section comprising side walls 13a, 13b, bottom wall 13c and respective lateral flanges 18, 19 parallel to the bottom wall 13c and to the flanges 16, 17 of the male mould half 12.

Between the flanges 16, 18 and the flanges 17, 19 are located seals 20, 21 which, when the flanges 16, 18 and 17, 19 are pressed together become compressed to seal the mould cavity 14 from the atmosphere. The flanges, it will be appreciated, extend entirely around the periphery of the moulds and consequently the flange 16 will at some point, not visible in the drawings, meet the flange 17 and may, indeed, be considered as a part of the same continuous flange surrounding the male mould half 12 whilst, likewise, the flanges 18 and 19 may be considered as different parts of the same continuous flange. The flanges 16, 18 and 17, 19 are pressed together, when the mould is assembled, by respective framework members 25, 22 and 23, 24 which themselves are secured in place by respective clamp units 25 (only one of which is visible in FIG. 1). It will be understood, however, that a plurality of clamp units, the precise number being dependent on the precise shape and configuration of the mould, would be provided at intervals along the framework members 23, 24 and 25, 22.

The male mould half 12 also has two vacuum outlets at opposite shoulders between the free edges of the side walls 12a, 12b and the associated flanges 16, 17, the vacuum outlets being generally identified with the reference numeral 27 and each comprising a mould insert 26 located in an opening in the male mould half 12 and having an internal bore 28 an outer end of which is enlarged and threaded to receive a duct holder 29 which retains in position a vacuum duct 30 at least a part of which is transparent. These components are illustrated in greater detail in FIG. 2. The two vacuum ducts 30 lead to respective vacuum isolation valves 31 which are joined by respective ducts 32 to a vacuum manifold 33 leading via a further line 34 to a vacuum source (not shown).

As will be seen from FIG. 2 the flange 17 of the male mould half 12 has a thickened root portion 35 at the point where the vacuum insert 26 is fitted thereby defining the rim of the mould cavity 14 by a surface closely approaching the upper surface of the lower flange 19 by a "pinch line" 36 of narrow dimensions, which may in fact reduce to zero if the clamps are tightened to press the flanges 17, 19 together until the thickened portion 35 contacts the flange 19 thereby compressing the seal 21 to the maximum extent.

In use of the mould apparatus described the two mould halves 12, 13 are brought together with the interposition of the seal 20, 21 to define the mould cavity 14, and the clamping frames 25, 22 and 23, 24 are brought into position and secured in place by the clamp unit 25 and any additional clamp units (not shown) which may be required. The mould halves 12, 13 are sufficiently rigid as to be unflexed by the pressure variations exerted on them in use.

After having assembled the mould cavity the fluid injection port 15 is closed and air is withdrawn through the vacuum outlet ports 26, for which purpose the isolation valves 31 are open to connect the duct 30, 32 and 34 to the vacuum source. When an appropriate vacuum has been formed in the mould cavity 14 fluid, conveniently resin, is introduced into the port 15 to fill the mould cavity 14, and complete filling of the cavity 14 can be seen when the vacuum outlet lines 30 contain the fluid. At this point the isolation valves 31 are closed. If one vacuum outlet line 30 fills before another, then the isolation valve 31 associated therewith is closed and this will tend to cause the filling of the remaining parts of the mould cavity, which will be evidenced by filing of the vacuum outlet lines 30 associated with those parts. When all the vacuum outlet lines indicate that the vacuum cavity is full and all the isolation valves 31 are closed the mould cavity 14 will be full but may be under a sub-atmospheric or only atmospheric pressure. Additional fluid is therefore injected through the injection port 15 to create a super-atmospheric pressure in the cavity 14. The port 15 is then closed and the mould left undisturbed for a period of time sufficiently long for the fluid to solidify or set. In the case of resin injection sufficient time is left for the resin to gel.

What is claimed is:

1. Apparatus for moulding a fluid settable material, comprising:

male and female mould halves which can be brought together to define therebetween a mould cavity, each said halves having flange means, sealing means interposable between said flange means for compression between said flange means on closure of said mould halves to seal said mould cavity from the atmosphere, clamping means to maintain said mould halves in a closed position, means defining at least one vacuum outlet from a mould half leading via an isolation valve to a vacuum source, means defining an inlet to said mould cavity for the introduction of a fluid settable material, and stop means on said mould halves for defining a line of closest approach of said mould halves on closure of said mould cavity, said stop means forming a pinch line located radially inwardly of said sealing means so as to define the periphery of a moulded product.

2. The apparatus of claim 1, wherein there are provided a plurality of vacuum outlets formed in the said mould half.

3. The apparatus of claim 2, wherein said plurality of vacuum outlets are spaced around the periphery of said mould cavity.

4. The apparatus of claim 1, wherein said vacuum outlets from the mould cavity include one or a plurality of ducts having a transparent duct section allowing visual inspection of the degree of filling of the mould cavity.

5. The apparatus of claim 1, wherein said inlet for introducing settable moulding material into the mould cavity is located at a point spaced from the vacuum outside by a predetermined maximum distance.

6. The apparatus of claim 1, wherein said vacuum outlets comprise mould inserts having threaded sockets for receiving an outlet duct retainer.

7. A method of moulding a plastic resin material, comprising the steps of:

providing male and female mould halves and clamping said mould halves together, pulling a vacuum in a mould cavity defined by said male and female mould halves and sealed from the atmosphere by sealing means, by withdrawing air therefrom through at least one vacuum outlet leading via an isolation valve to a vacuum source, the mould halves being shaped such that a pinch line located radially inwardly of said sealing means is formed, said pinch line defining the periphery of a moulded product, injecting a plastic resin material into the thus evacuated mould cavity while maintaining communication with said vacuum source until the mould cavity is wholly filled by the plastic resin material, closing the said isolation valve between the vacuum outlet through which the air from the mould cavity is drawn and the vacuum source, injecting a small additional quantity of plastic resin material under pressure into the mould cavity, closing the inlet through which the fluid material is introduced into the mould cavity and allowing the plastic resin material to solidify.

8. The method of claim 7, wherein said vacuum isolation valve is separated from the vacuum outlet from the mould cavity by a length of transparent ducting, and the step of closing the isolation valve is effected when the plastic resin material introduced into the mould cavity appears in the said transparent ducting.

9. Resin moulding apparatus for moulding plastic resin, comprising:

first and second mould halves which can be brought together to define therebetween a mould cavity, first and second flange means projecting from said first and second mould halves respectively, around the periphery thereof, sealing means interposable between said first and second flange means of said mould halves for compression therebetween as said mould halves are brought together to close said mould cavity, clamp means engageable on said first and second flange means whereby to hold said first and second mould halves together to define said mould cavity and compress said sealing means between said first and second flange means, said clamp means clamping said mould halves together to maintain said mould cavity when resin is injected into said mould cavity under pressure, means defining at least one vacuum outlet from one of said first and second mould halves leading via an isolation valve to a vacuum source, means defining an inlet in at least one of said mould halves for the introduction of plastic resin into said mould cavity under pressure, and stop means on said mould halves for defining a line of closest approach of said mould halves on closure of said mould cavity, said stop means forming a pinch line located radially inwardly of said sealing means so as to define the periphery of a moulded product.

10. The apparatus of claim 9, wherein there are provided a plurality of vacuum outlets formed in the said mould half.

11. The apparatus of claim 10, wherein said plurality of vacuum outlets are spaced around the periphery of said mould cavity adjacent said flanges.

12. The apparatus of claim 9 wherein said at least one vacuum outlet from the mould cavity includes at least one duct having a transparent duct section allowing visual inspection of the degree of filling of the mould cavity.

13. The apparatus of claim 9 wherein said injection point for introducing plastic resin material into the vacuum cavity is located at a point spaced from the vacuum outlets by a predetermined maximum distance.

14. The apparatus of claim 9, wherein said vacuum outlets comprise mould inserts having threaded sockets for receiving an outlet duct retainer.

* * * * *